United States Patent
Liu

(10) Patent No.: US 8,638,570 B2
(45) Date of Patent: Jan. 28, 2014

(54) EMI SHIELD APPARATUS AND ELECTRONIC DEVICE WITH SAME

(75) Inventor: Lei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 235 days.

(21) Appl. No.: 13/172,862

(22) Filed: Jun. 30, 2011

(65) Prior Publication Data

US 2012/0147582 A1 Jun. 14, 2012

(30) Foreign Application Priority Data

Dec. 9, 2010 (CN) .......................... 2010 1 0580856

(51) Int. Cl.
*H05K 9/00* (2006.01)

(52) U.S. Cl.
USPC .......... 361/818; 361/679.4; 361/816; 349/59; 174/377

(58) Field of Classification Search
USPC .......... 361/679.4, 16, 817, 818; 174/32, 350, 174/377–380, 382, 384–385, 387, 395; 349/59; 307/89, 91
See application file for complete search history.

(56) References Cited

U.S. PATENT DOCUMENTS

| | | | | |
|---|---|---|---|---|
| 5,097,885 | A * | 3/1992 | Kitagawa | 160/84.01 |
| 6,477,061 | B1 * | 11/2002 | Johnson | 361/818 |
| 7,687,726 | B2 * | 3/2010 | Segalen | 174/377 |
| 7,944,523 | B2 * | 5/2011 | Kwak et al. | 349/59 |

* cited by examiner

*Primary Examiner* — Jinhee Lee
*Assistant Examiner* — Dimary Lopez
(74) *Attorney, Agent, or Firm* — Altis Law Group, Inc.

(57) ABSTRACT

An electromagnetic interference (EMI) shield apparatus includes a shell, a hub, a shield member, a partition plate, a resilient member, and a cover. The hub is rotatably mounted within the shell. The shield member is wrapped around the hub. The partition plate is fastened to and rotatable together with the hub. The cover covered on an open end of the shell. The resilient member is connected between the partition plate and the cover to drive the hub to rotate to reel the shield member. The shield member is made of EMI shield material.

9 Claims, 5 Drawing Sheets

EMI SHIELD APPARATUS AND ELECTRONIC DEVICE WITH SAME

BACKGROUND

1. Technical Field

The present disclosure relates to an electronic device with an electromagnetic interference (EMI) shield apparatus.

2. Description of Related Art

At present, electronic devices, such as computers or servers, ordinarily define a plurality of input or output (I/O) apertures in the chassis thereof. When input or output connectors are installed in the electronic device, the apertures enable interfaces of the input or output connectors to be exposed to the outside of the electronic device. However, some I/O apertures do not have any connectors provided thereat. Such I/O apertures expose the interior of the electronic device to the outside of the electronic device, and allow electromagnetic radiation to enter and leave the electronic device. Thus, the electronic device is liable to sustain EMI, and/or to cause EMI in a nearby electronic apparatus.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
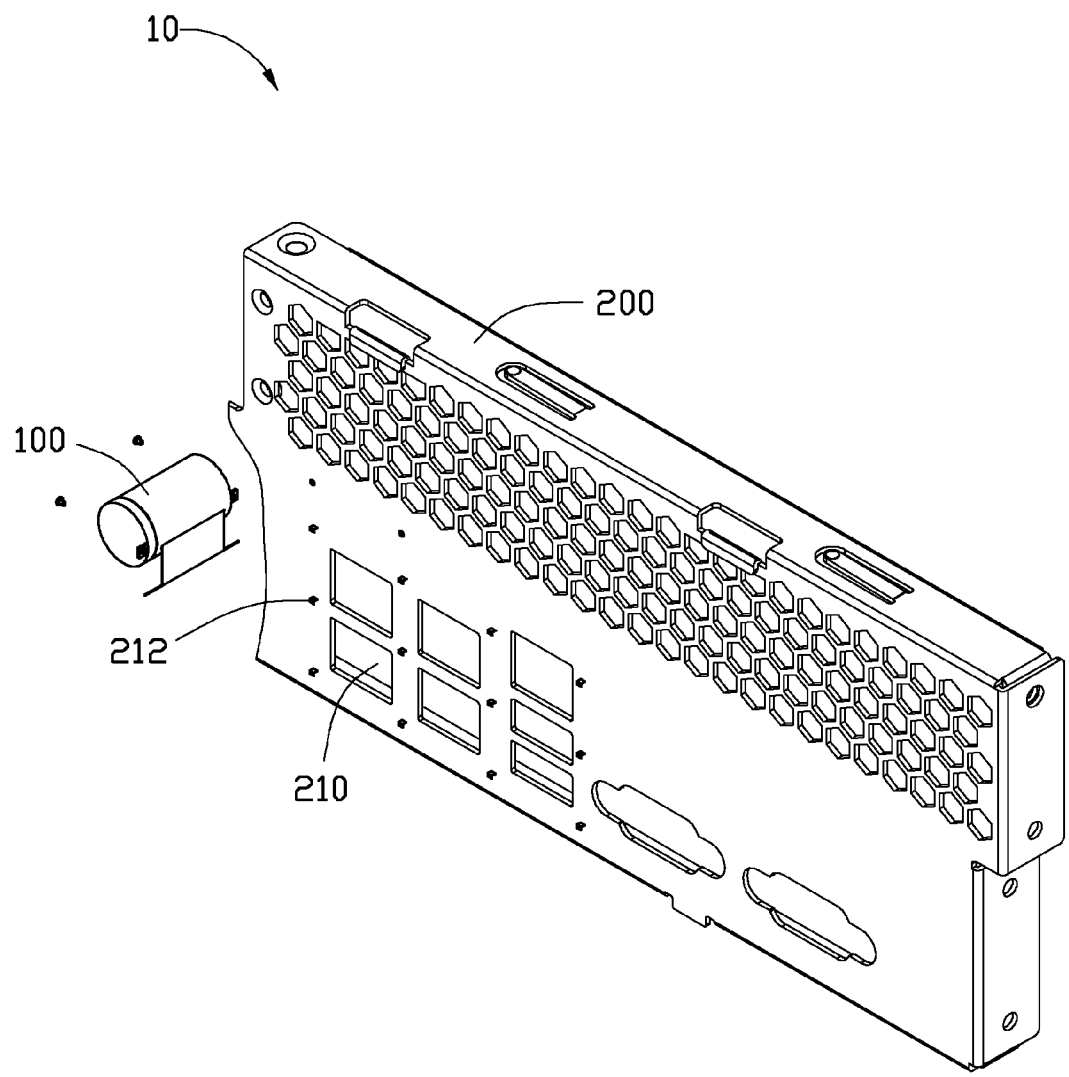
FIG. 1 is an exploded, isometric view of an exemplary embodiment of part of an electronic device, wherein the electronic device includes a chassis and an electromagnetic interference (EMI) shield apparatus.

Referring to FIG. 1, an exemplary embodiment of an electronic device 10 includes a chassis 200 and an electromagnetic interference (EMI) shield apparatus 100 mounted to the chassis 200. The chassis 200 defines a plurality of input or output (I/O) aperture 210 therein. Two hooks 212 protrude from the chassis 200, at two opposite ends of each I/O aperture 210, respectively. In the embodiment, the electronic device 10 is a server, and only a rear of the server is shown.

Figure 2:
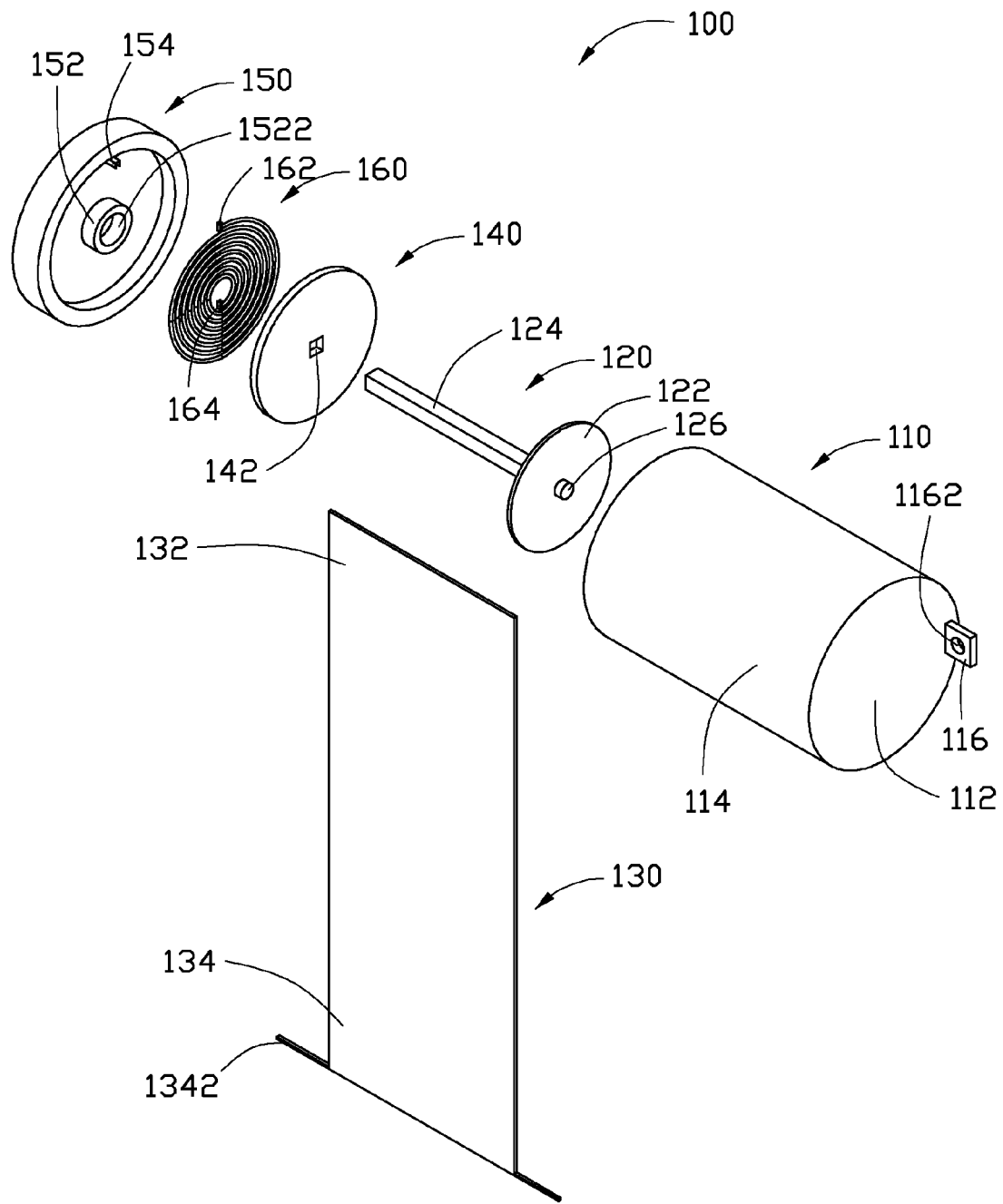
FIG. 2 is an enlarged, exploded, isometric view of the EMI shield apparatus of FIG. 1.
Figure 3:
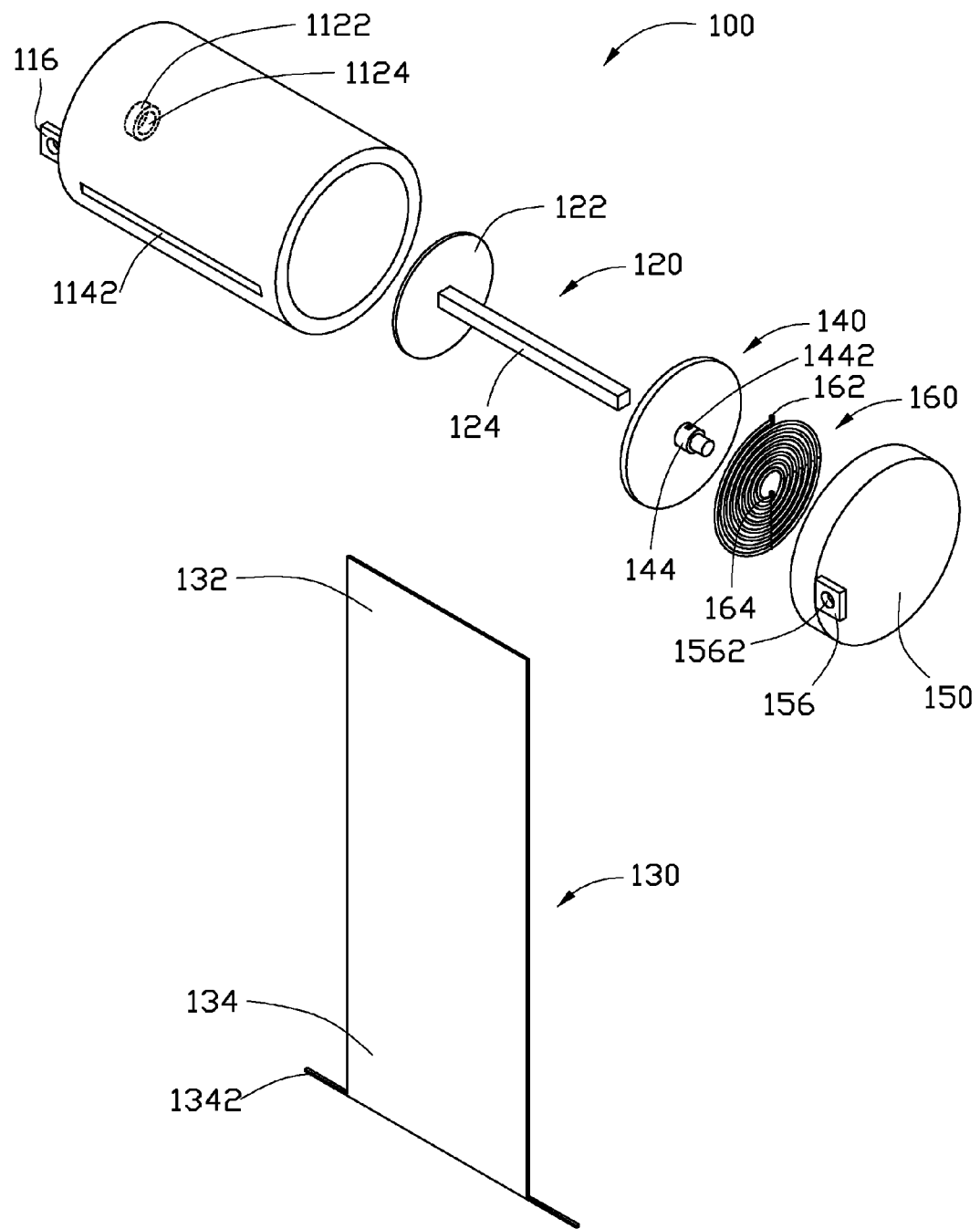
FIG. 3 is similar to FIG. 2, but viewed from another perspective.
Figure 4:
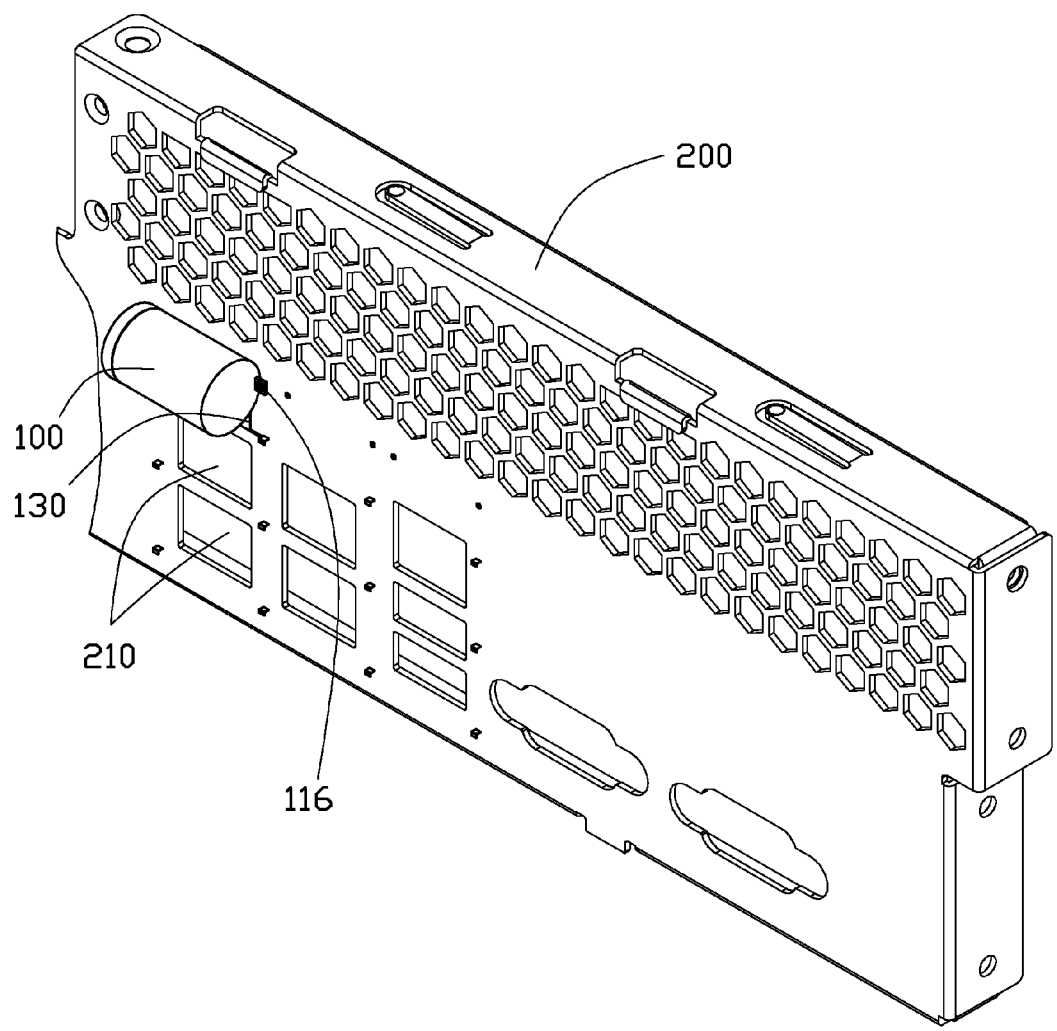
FIG. 4 is an assembled, isometric view of FIG. 1.

Referring to FIGS. 2-3, the EMI shield apparatus 100 includes a hollow column-shaped shell 110 with a blind end and an open end. A hub 120 is rotatably mounted within the shell 110, a shield member 130 is wrapped around the hub 120, and a partition plate 140 is fastened to and is rotatable together with the hub 120. A cover 150 covers the open end of the shell 110, and a resilient member 160 connects between the partition plate 140 and the cover 150.

The resilient member 160 is a flat spiral spring, and includes a first end 162 at an outer side of the resilient member 160, and a second end 164 at an inner side of the resilient member 160.

The shell 110 includes an annular sidewall 114, and an end wall 112 perpendicularly connected to a first end of the sidewall 114 to form the blind end. A column-shaped first holder 1122 extends from a center of an inner side of the end wall 112 toward the open end. A first pin hole 1124 is axially defined in the first holder 1122. A slot 1142 is defined in the sidewall 114, along a direction parallel to an axis of the shell 110. A tab 116 extends from an outer side of the end wall 112, adjacent to the slot 1142. A fixing hole 1162 is defined in the tab 116.

The hub 120 includes a disc-shaped main body 122, a bar-shaped shaft 124 perpendicularly extending from a center of a first side of the main body 122, and a column-shaped first pin 126 perpendicularly protruding from a center of a second side of the main body 122 away from the shaft 124. The first pin 126 can be pivotably engaged in the first pin hole 1124 of the shell 110. The shaft 124 has a substantially square-shaped cross-section.

The shield member 130 is planar, and made of EMI shield material, such as iron or copper. The width of the shield member 130 is greater than the width of the I/O aperture 210. Two latching portions 1342 extend from two opposite sides of a first end 134 of the shield member 130.

The partition plate 140 is disc-shaped, and defines a substantially square-shaped fixing hole 142 in a center of a first side thereof. A second pin 144 extends from a center of a second side of the partition plate 140, opposite to the fixing hole 142. A holding hole 1442 is defined in the sidewall of the second pin 144.

The cover 150 is substantially disc-shaped. A second holder 152 extends from a center of an inner side of the cover 150, and the second holder 152 axially defines a second pin hole 1522. A fixing portion 154 is formed on the inner side of the cover 150. A tab 156 extends from an outer side of the cover 150, and the tab 156 defines a fixing hole 1562.

Referring to FIGS. 1-4, in assembly, the hub 120 is received in the shell 110, and the first pin 126 of the hub 120 is rotatably engaged in the first pin hole 1124 of the first holder 1122 of the shell 110.

A second end 132 of the shield member 130 opposite to the first end 134 extends through the slot 1142 of the shell 110 to be fixed to the shaft 124 of the hub 120. The latching portions 1342 of the first end 134 are exposed out of the shell 110.

The partition plate 140 is fixed to the hub 120 by a second end of the shaft 124 of the hub 120 being fixed in the fixing hole 142 of the partition plate 140. The partition plate 140 is rotated to rotate the shaft 124, thereby rolling the shield member 130 about the shaft 124.

The resilient member 160 fits about the second pin 144 of the partition plate 140, and the second end 164 of the resilient member 160 is inserted into the holding hole 1442 of the second pin 144.

The cover 150 covers the open end of the shell 110. The partition plate 140 is received in the cover 150. The first end 162 of the resilient member 160 is fixed to the fixing portion 154 of the cover 150. The second pin 144 of the partition plate 140 is rotatably engaged in the second pin hole 1522 of the second holder 152 of the cover 150.

The EMI shield apparatus 100 is attached to the chassis 200. Two fasteners (not shown) correspondingly extend through the fixing holes 1162 and 1562 of the tabs 116 and 156 of the EMI shield apparatus 100, and are fixed to the chassis 200 above the I/O aperture 210. The shield member 130 abuts against the chassis 200.

Figure 5:
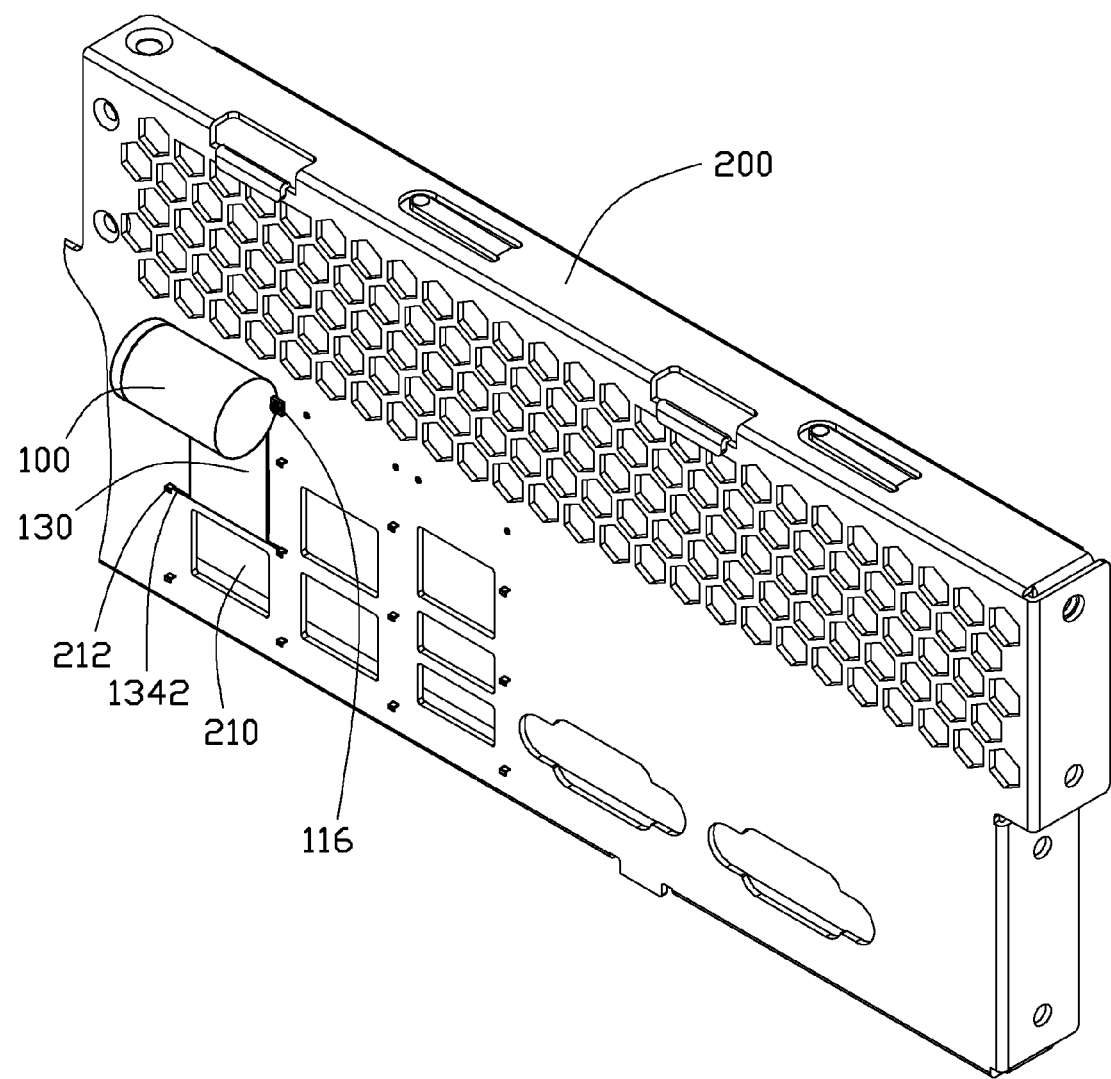
FIG. 5 is similar to FIG. 4, but shows one state of the EMI shield apparatus when in use.

Referring to FIG. 5, in use, when the I/O aperture 210 of the chassis 200 need to be shielded, the first end 134 of the shield member 130 is pulled down. The shaft 124 of the hub 120 is rotated, thereby deforming the resilient member 160. The latching portions 1342 of the shield member 130 are latched to the corresponding hooks 212 of the chassis 200. Thus, the I/O aperture 210 are covered by the shield member 130. However, when the EMI shield apparatus 100 is not in use, the latching portions 1342 of the shield member 130 are disengaged from the hooks 212 of the chassis 200. The resilient member 160 is restored to drive the hub 120 and the partition plate 140 to rotate, and the shield member 130 is withdrawn back into the shell 110.

While the disclosure describes examples and embodiments, it is to be understood that the disclosure is not limited thereto. To the contrary, the disclosure is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An electronic device comprising:
   a chassis defining an input or output (I/O) aperture therein; and
   an electromagnetic interference (EMI) shield apparatus mounted to the chassis to cover or uncover the I/O aperture as desired, wherein the EMI shield apparatus comprises:
   a hollow shell comprising a sidewall defining a slot therein;
   a hub rotatably mounted within the shell; and
   a shield member wrapped around the hub, a distal end of the shield member extending out of the shell through the slot, wherein the shield member is further extendable out of the shell by pulling so that the shield member covers the I/O aperture, the shield member is retractable back into the shell from a position where the shield member covers the I/O aperture to uncover the I/O aperture, and the shield member made of EMI shield material.

2. The electronic device of claim 1, wherein a hook protrudes from the chassis below the I/O aperture, the shield member further comprises a latching portion extending from a distal end to engage with the hook in response to the shield member covering the I/O aperture.

3. The electronic device of claim 1, wherein the shell is substantially column-shaped, and comprises an annular sidewall and an end wall connected to a first end of the sidewall.

4. The electronic device of claim 3, wherein the slot is defined in the sidewall, along an axial direction of the shell.

5. The electronic device of claim 3, wherein a first holder extends from a center of an inner side of the end wall, and the first holder axially defines a first pin hole, wherein the hub comprises a main body, a first pin extends from a center of a first side of the main body, and the first pin is rotatably engaged in the first pin hole of the shell.

6. The electronic device of claim 5, wherein the hub further comprising a cover opposite to the main body, and a partition plate, wherein the cover comprises a second holder extending from a center of an inner side of the cover facing the main body, the second holder axially defines a second pin hole, wherein the partition plate comprises a second pin that extends from a center of the partition plate opposite to the main body, the second pin is rotatably engaged in the second pin hole.

7. The electronic device of claim 6, wherein the hub further comprises a shaft connected between centers of the main body and the partition plate.

8. The electronic device of claim 7, further comprising a resilient member connected between the cover and the partition plate to bias the hub to rotate to warp the shield member, wherein a holding hole is defined in the sidewall of the second pin, a fixing portion is formed on the inner side of the cover; wherein the resilient member comprise a first end fixed to the fixing portion, and a second end inserted into the holding hole.

9. The electronic device of claim 8, wherein the resilient member is a flat spiral spring.

* * * * *